(12) United States Patent
Sun et al.

(10) Patent No.: US 7,672,540 B2
(45) Date of Patent: Mar. 2, 2010

(54) NONRIGID REGISTRATION OF CARDIAC PERFUSION MR IMAGES USING ADAPTIVE LOCAL TEMPLATE MATCHING

(75) Inventors: Ying Sun, West Windsor, NJ (US); Gareth Funka-Lea, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1036 days.

(21) Appl. No.: 11/365,273

(22) Filed: Mar. 1, 2006

(65) Prior Publication Data

US 2007/0014489 A1    Jan. 18, 2007

Related U.S. Application Data

(60) Provisional application No. 60/698,829, filed on Jul. 13, 2005.

(51) Int. Cl.
*G06K 9/32* (2006.01)
*G06K 9/00* (2006.01)

(52) U.S. Cl. ........................... 382/294; 382/128
(58) Field of Classification Search ......... 382/128–134, 382/298, 312; 378/8, 15, 19, 901; 600/407; 348/51
See application file for complete search history.

(56) References Cited

U.S. PATENT DOCUMENTS

| 6,480,615 | B1 * | 11/2002 | Sun et al. | 382/103 |
| 6,888,915 | B2 * | 5/2005 | Koenig et al. | 378/8 |
| 2005/0074154 | A1 * | 4/2005 | Georgescu et al. | 382/128 |
| 2007/0179377 | A1 * | 8/2007 | Carlsen et al. | 600/407 |

* cited by examiner

*Primary Examiner*—Kanji Patel
(74) *Attorney, Agent, or Firm*—Donald B. Paschburg

(57) ABSTRACT

Motion of the heart during contrast enhancement is modeled at two hierarchical levels: global translation and local deformation. Large-scale, i.e., global, translational motion is identified using global template matching, while the local deformation of a portion of the object (e.g., the left ventricle where the object is a heart) is obtained using an adaptive local template matching scheme which adapts to the local edge distributions by varying the height and the width of the template as well as the location of the template followed by spatial regularization. To address the difficulty of rapid intensity changes across the image sequence as the contrast agent perfuse into the tissue, an edge-based similarity measure is used for template matching.

7 Claims, 8 Drawing Sheets

Discrete Displacements

Certainty Map

Current Frame

Reference Frame

NONRIGID REGISTRATION OF CARDIAC PERFUSION MR IMAGES USING ADAPTIVE LOCAL TEMPLATE MATCHING

CROSS-REFERENCE TO RELATED APPLICATION

This application claims priority from U.S. Provisional application No. 60/698,829 filed Jul. 13, 2005, which is incorporated herein by reference.

TECHNICAL FIELD

This invention relates generally to perfusion magnetic resonance imaging (MRI) and more particularly to nonridgid registration used in perfusion magnetic resonance imaging.

BACKGROUND

As is known in the art, cardiac perfusion magnetic resonance imaging (MRI) provides a valuable tool for diagnosing cardiovascular diseases in an accurate manner, see, for example, an article by E. Nagel et al. entitled "Magnetic resonance perfusion measurements for the noninvasive detection of coronary artery disease", published in *Circulation*, 108(4):432-437, July, 2003. In a cardiac MR perfusion study, the heart is scanned along short-axis slices repeatedly at the same phase of the cardiac cycle through electrocardiographic (ECG) gating, following a bolus injection of a contrast agent. Because it takes a few minutes to acquire dynamic gated images and to obtain reliable information about the perfusion, patient breathing during image acquisition often causes large variations in the position of the left ventricle (LV) at different frames of the acquired cardiac MR image sequence. A change in the position of the diaphragm results in both in-plane and through-plane motion of the heart relative to the MR acquisition plane. At the same time, the shape of the heart might change over the course of contrast enhancement due to the noise in the ECG gating signal and changes in heart rate. Therefore, nonrigid, i.e., flexible, registration must be performed on time-series images to account for both local deformation and global translation so that appropriate pixel correspondence can be established between different frames.

A goal of a cardiac perfusion study is to evaluate the perfusion within the ventricle muscle. Dead or ischemic tissue will show a perfusion deficit. An important challenge in perfusion analysis is recovering a consistent definition of the LV boundaries so that a signal time curve reflects the perfusion of a single local tissue sample. Contours defined too far into the blood pool or around papillary muscles that extend into the blood pool will result in a contaminated signal.

Several methods have been proposed for automatic registration of cardiac MR perfusion images. L. M. Bidaut and J.-P. Vallee proposed in an article entitled "Automated registration of dynamic MR images for the quantification of myocardial perfusion", published in the *Journal of Magnetic Resonance Imaging*, 13:648-655, 2001, a registration method that minimizes intrinsic intensity differences inside a manually drawn mask between each image and a reference image coupled to a two-dimensional rigid body correction. Another intensity-based multi-resolution registration algorithm was proposed by C. Dornier et al. in an article entitled "Improvement in the quantification of myocardial perfusion using an automatic spline-based registration algorithm", published in *Journal of Magnetic Resonance Imaging*, 18:160-168, 2003. These intensity-based algorithms do not take into account the fact that the signal intensity at the same physical location changes rapidly across the MR image sequence due to the wash-in and wash-out of the contrast agent. To address this problem, R. Bansal and G. Funka-Lea. proposed in an article entitled "Integrated image registration for cardiac MR perfusion data", published in *MICCAI*(1) 2002:659-666, an image registration algorithm that utilizes the maximization of mutual information. However, it only estimates the integer pixel translation of the two manually drawn contours. Recently, Y. Sun, M.-P. Jolly, and J. M. F. Moura in an article entitled "Contrast-invariant Registration of Cardiac and Renal MR Perfusion Images", published in *MICCAI*, France, September 2004, introduced a contrast-invariant similarity metric and proposed a common framework to perform affine registration on both cardiac and renal MR perfusion images.

SUMMARY

In accordance with the present invention, a method is provided for registering a sequence of images of an object. The method includes identifying motion of the object using global template matching; obtaining local deformation of the object using adaptive local template matching; and applying weighted spatial regularization to the obtained local deformation.

In one embodiment, the local template adapts to the local edge distributions by varying the height and the width of the template as well as the location of the template.

In one embodiment, the adaptive local template matching comprises using an edge based similarity measure.

In one embodiment, the images are dynamic profusion MR images.

In one embodiment, the object is a human heart and the local deformation is of the left ventricle (LV) of such heart.

In one embodiment, motion of the heart during contrast enhancement is modeled at two hierarchical levels: global translation and local deformation.

In one embodiment, the object is a human heart and the local deformation is, i.e., global, translational motion is identified using global template matching, while the local deformation of a portion of the object (e.g., the left ventricle where the object is a heart) is obtained using an adaptive local template matching scheme followed by spatial regularization. To address the difficulty of rapid intensity changes across the image sequence as the contrast agent perfuse into the tissue, an edge-based similarity measure is used for template matching.

With such method, local deformation of the object is compensated using an automatic nonrigid registration algorithm that only requires the user to crop a region of interest (ROI) containing the LV in a single high-contrast frame.

In accordance with another feature of the invention, a method is provided for registering a sequence of images of an object. The method includes: identifying motion of the object using global template matching and obtaining local deformation of the object. The local deformation comprises: defining a threshold $G_{th}$ for a gradient map and a threshold $Ah_{th}$ for an area of a local template; obtaining a set of pixels, P, whose gradient magnitudes are greater than $G_{th}$; for each pixel p(x, y) within a region of interest, selecting from P its K nearest neighbors N(x, y); finding the minimum bounding box that encloses pixel (x, y) as well as N(x, y); setting the center of the local template as the center of the bonding box; computing the area of the bounding box $A_N(x, y)$; setting the area of the local template as $A(x, y)=\max(A_N(x, y), A_{th})$; setting the ratio between height and width of a template r(x, y); determining the height and the width of the local template for pixel (x, y); and; estimating displacement of pixel (x, y) based on its local template.

In one embodiment, $$r(x, y) = \frac{\sum_{(x,y) \in N(x,y)} M(x, y)|\sin(\theta(x, y,))|}{\sum_{(x,y) \in N(x,y)} M(x, y)|\cos(\theta(x, y,))|}.$$

where: $\theta(x, y)$ and $M(x, y)$ stand for respectively the orientation and the magnitude of the gradient.

In one embodiment, the process includes applying weighted spatial regularization to the obtained local deformation.

In one embodiment, the applying weighted spatial regularization to the obtained local deformation comprises: obtaining a certainty map of the displacement estimation; selecting a 2-dimensional Gaussian applicability function; and applying normalized convolution using the obtained certainty map and the Gaussian applicability function to obtain a regularized displacement field.

In one embodiment, the certainty map is:

$$C(dx,dy,t_c) = \max(|v(dx,dy,t_r)|_2 \cdot S(dx,dy,t_c), 0)$$

where $S^*(dx,dy,t_c)$ is the local maximum similarity measure in the current frame and $|v(dx,dy,t_r)|_2$ is the gradient magnitude in the reference frame.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3C shows rectangles specifying the bounding box of each template;

FIG. 4B shows the certainty map for the estimated displacements displayed in FIG. 4A; FIG. 4C shows the final deformation obtained using the certainty map shown in FIG. 4B and a 2-D Gaussian applicability function with $\sigma=1.0$; FIG. 4D shows the deformation field of the reference frame.

FIG. 6A shows definition of the small ROI (2×2 pixel in size) on the myocardium for assessing the intensity-time curves; FIG. 6B shows the average intensity-time curves inside the ROI for the original (raw) data set, after compensating for global translation, and after performing nonrigid registration; and, FIG. 6C shows an enlarged view of the intensity-time signals for frames 35-40 in FIG. 6B;

Like reference symbols in the various drawings indicate like elements.

DETAILED DESCRIPTION

Figure 1:
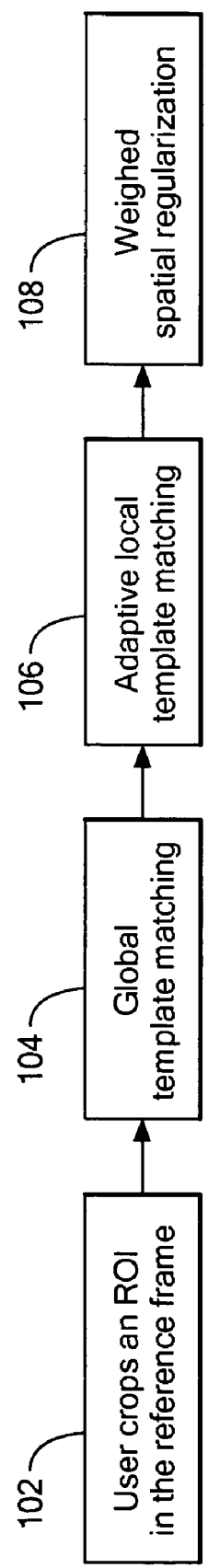
FIG. 1 is a flow block diagram of the registration process according to the invention.

Referring now to FIG. 1, a flow diagram is shown for process for registering a sequence of images of an object, here, in this example, the human heart and more particularly, a local ROI of such heart, here LV of such heart. Since global translation induced by patient breathing is the dominant motion in cardiac MRI, the process solves the problem of registration of a sequence of images of the heart at two hierarchical levels: global translation followed by local deformation. The sequence of MR images is synchronized with ECG signals produced by the heart. The user is required to select from the sequence of MR images one reference frame that has a good contrast and then crop a rectangular ROI that contains the LV. This simple requirement is reasonable from the application point of view. The process steps are described in detail in the following sections with experiments on real patient cardiac MRI data.

More particularly, the registration process includes: identifying motion of the object using global template matching; obtaining local deformation of the object using adaptive local template matching which adapts to the local edge distributions by varying the height and the width of the template as well as the location of the template; and applying weighted spatial regularization to the obtained local deformation. Thus, as shown in FIG. 1, the user crops a region of interest (ROI) in the reference frame that includes the object (Step 102); applies global template matching to the object (Step 104); uses adaptive local template match which adapts to the local edge distributions by varying the height and the width of the template as well as the location of the template to be describe in more detail in connection with FIG. 7 (Step 106); and, applies spatial weighing registration to be describe in more detail in connection with FIG. 8 (Step 108).

Global Template Matching

Given a rectangular ROI in the reference frame, the process determines the best match in other frames by shifting the bounding box of the selected ROI with integer pixel offsets. For efficiency and simplicity, global translation of the ROI at each frame is identified by template matching such as described by R. O. Duda, P. E. Hart, and D. G. Stork in Pattern Recognition, 2nd Edition. Wiley, New York, 2001. The performance of template matching depends crucially on the features that are used to build the template, reference being made to an article by K. Levi and Y. Weiss in "Learning object detection from a small number of examples: the importance of good features", published in *Proc. CVPR'04*, 2004.

Figure 2:
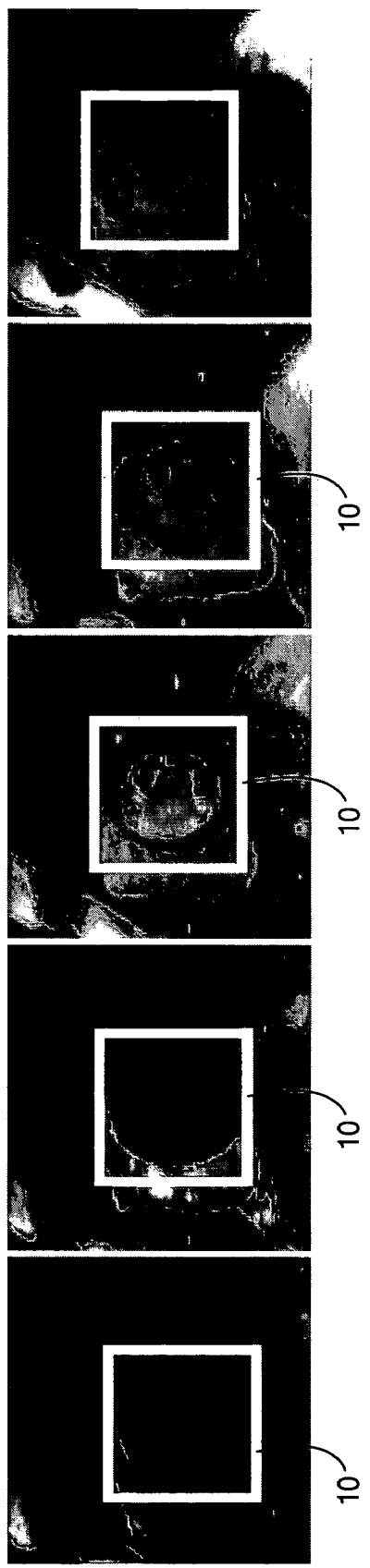
FIG. 2 show registration results obtained using global template matching method for selected frames from a cardiac MR perfusion image sequence according to the one step of the process of FIG. 1.

In cardiac perfusion MRI, the intensities of the acquired time-series images change rapidly as the contrast agent flows through the heart as shown in FIG. 2, while the orientation of the edges along tissue boundaries tends to remain consistent across the image sequence provided that the LV does not undergo significant elastic deformation or rotation. Because edge information has proven to be more invariant and reliable than intensity values, the process uses an edge-based similarity measure for template matching. More particularly, let $R=\{(x, y)|x_a \leqq x \leqq x_b, y_a \leqq Y \leqq y_b\}$ denote the set of pixels in the ROI, where $(X_a, y_a)$ and $(X_b, Y_b)$ are the two diagonal points that specify the bounding box of the ROI. The process collects, in a vector, the gradients at pixel (x, y) in frame t:

$$v(x, y, t) = [G_x(x, y, t) G_y(x, y, t)]^T, \quad (1)$$

where the gradients are obtained by convolving Sobel filters with Gaussian blurred image, see K. R. Castleman. *Digital Image Processing*. Prentice Hall, 1996. For each displacement pair(dx,dy), the process measures the similarity between the current frame $t_c$ and the reference frame $t_r$ by:

$$S(dx, dy, t_c) = \frac{\sum_{(x,y) \in R} v^T(x, y, t_r) v(x+dx, y+dy, t_c)}{\sum_{(x,y) \in R} |v(x, y, t_r)|_2 |v(x+dx, y+dy, t_c)|_2} \quad (2)$$

where $|\cdot|_2$ stands for the $L_2$ norm.

The above similarity measure can be viewed as a weighted average of the cosine of the angle between vectors $v(x, y, t_r)$ and $v(x+dx, y+dy, t_c)$ over the entire ROI, where the weight is proportional to the product of the gradient magnitudes. The value of the similarity measure ranges between −1 and +1: it reaches +1/−1 when every edge in the current frame points to exactly the same/opposite direction of the corresponding edge in the reference frame. As a result, this similarity measure is not sensitive to changes in image intensity. Instead, it always favors strong gradients whose orientations are consistent with those of the strong edges in the reference frame. The integer displacement (dx*,dy*) that achieves the maximum similarity measure is determined by exploring all possible solutions (dx,dy) over a reasonable large search space.

In practice, it is not cost-efficient to consider every pixel in the reference ROI because the majority of the pixels have very weak gradient magnitudes, and hence they hardly affect the value of the similarity measure in equation (2). Therefore, it is possible to reduce the computational cost without degrading the registration accuracy, by ignoring the pixels with weak gradient magnitude while only keeping salient pixels with strong gradient magnitude.

FIG. 2 displays the results obtained using global template matching for selected frames from a cardiac MR perfusion study. To illustrate the performance of the algorithm, the bounding box 10 of the ROI is shifted to the best match location in each frame. Despite the fact that translational motion between two adjacent frames can be considerably large, the process reliably identifies the position of the selected ROI across the image sequence. For this particular data set, the values of dx and dy vary from −4 to 5 and from −3 to 2 pixels, respectively.

Adaptive Local Template Matching

By aligning the ROI from different frames according to the resulting integer pixel shifts for each frame, a roughly registered ROI sequence is obtained. In this ROI sequence, there is still some residue motion incurred by the local deformation of the left ventricle. For instance, it is easy to notice the shape difference between the left ventricles in the last two images in FIG. 2. To further improve the registration accuracy, the process estimates the displacement at each pixel inside the ROI using adaptive local template matching which adapts to the local edge distributions by varying the height and the width of the template as well as the location of the template.

For local template matching, it is important to select the appropriate size of the template, due to the trade-off between localization accuracy and reliability of the matching. Large template tends to degrade the localization accuracy because the estimated displacement is an average estimation over the entire template. On the other hand, when the template is too small, there is not enough support to obtain a reliable estimate. In addition, the orientation of the template also plays an important role. For a strong vertical edge, it is easier to identify the displacement along the horizontal direction rather than the vertical direction. Intuitively, a vertical rectangular template should be used in order to resolve the ambiguity in the vertical direction. For these reasons, it is desirable to treat each individual pixel differently and come up with a scheme to adaptively select the template for each pixel.

The process adjusts the height and the width of the template for each pixel adaptively according to its local gradient information in the reference frame. FIGS. 3A and 3B display the intensity image and the corresponding gradient magnitude, respectively. Since strong gradients are more reliable than the weak ones, the process threshold the gradient map to obtain a set of selected pixels P with strong gradient magnitude. For each pixel (x, y), the process first selects from set P its K (i.e., K=25) nearest neighbors denoted by N(x, y)∈P, and then find the minimum bounding box that encloses pixel (x, y) as well as N(x; y). The center of the local template is selected as the center of the minimum bounding box. The area of the local template A(x, y) is determined by choosing the larger value between the area of the minimum bounding box and a predefined threshold. Let θ(x, y) and M(x, y) stand for respectively the orientation and the magnitude of the gradient, the ratio between the height and the width of the template is given by $$r(x, y) = \frac{\sum_{(x,y) \in N(x,y)} M(x, y) |\sin(\theta(x, y,))|}{\sum_{(x,y) \in N(x,y)} M(x, y) |\cos(\theta(x, y,))|} \quad (3)$$

Finally, the height and the width of the template at pixel (x, y) as $\sqrt{A(x,y) r(x,y)}$ and $\sqrt{A(x,y)/r(x,y)}$, respectively, are determined.

Figure 3C:
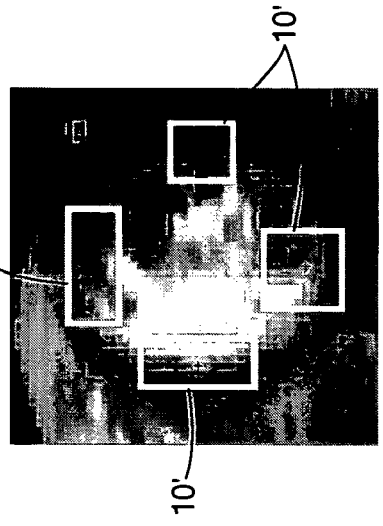
FIGS. 3A-3C illustrate the selection of adaptive local templates using the reference ROI according to a second step of the process of FIG. 1, FIGS. 3A and 3B displaying the intensity image and the corresponding gradient magnitude, respectively.
Figure 3B:
Figure 3A:
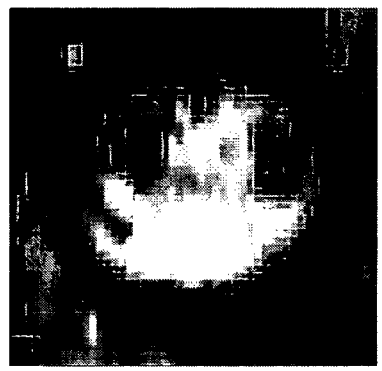
Figure 4A:
FIGS. 4A-4D show, from discrete displacements to spatially regularized continuous deformation using the process of FIG. 1, FIG. 4A displays the discrete displacement field obtained using local template matching for one frame.

FIG. 3C shows the local templates that have been automatically determined using the process for four selected pixels. In FIG. 3C, the rectangles specify the bounding box 10' of each template. As shown, these templates are set according to the local gradient orientation of each pixel; they vary a lot in size and orientation. The similarity measure for local template matching is refined from equation (2) by summing over the local template of each individual pixel, instead of summing over the entire ROI. FIG. 4A displays the discrete displacement field obtained using local template matching for one frame.

Figure 7:
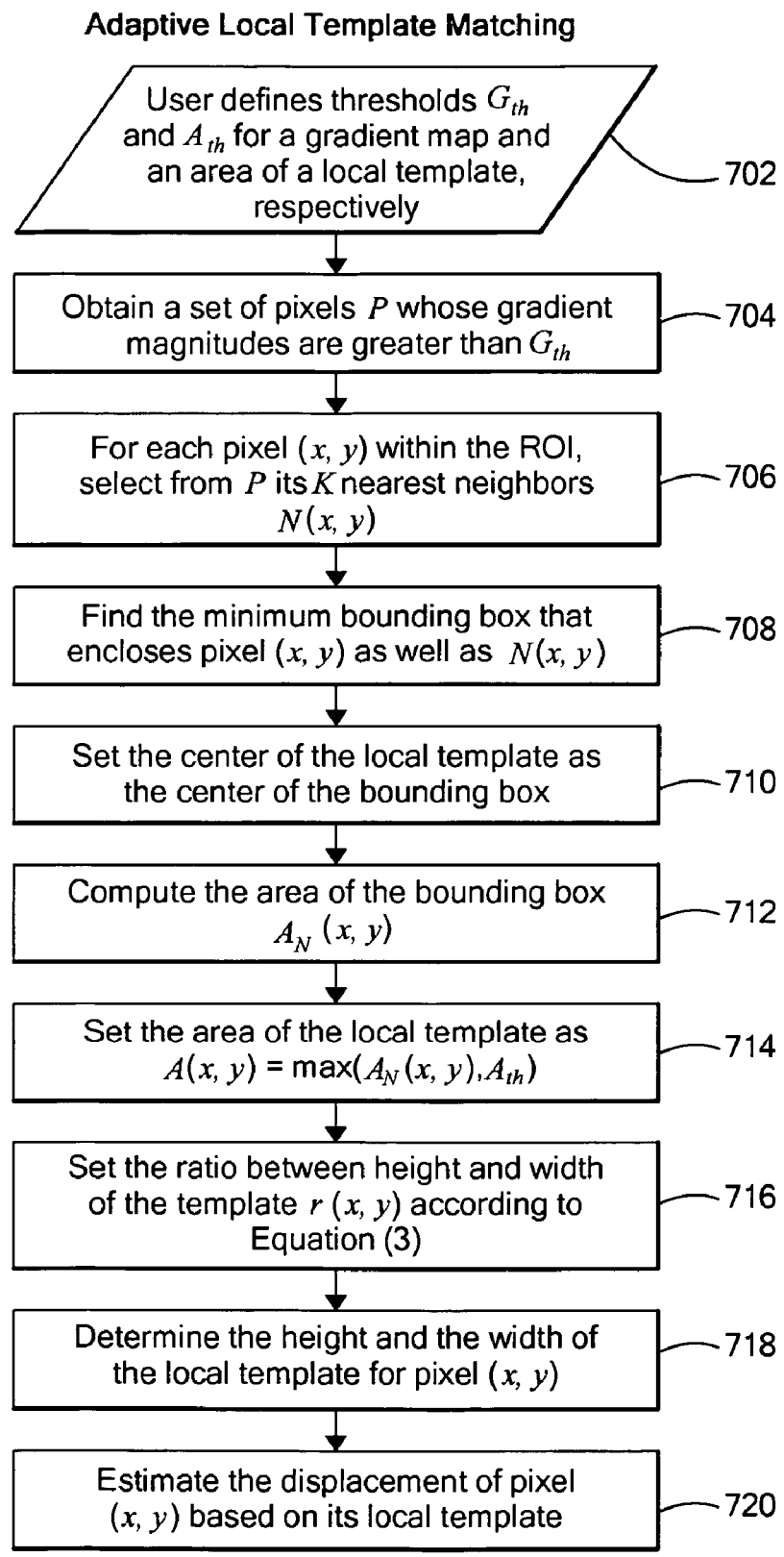
FIG. 7 is a flow diagram of an adaptive local template matching process used in the registration process of FIG. 1 in accordance with the invention.

Thus, referring to FIG. 7, the user defines the thresholds $G_{th}$ and $A_{th}$ for the gradient map and the area of the local template, respectively (Step 702). The process obtains a set of pixels, P, whose gradient magnitudes are greater than the threshold for a gradient map, $G_{th}$ (Step 704). For each pixel (x, y) within the ROI, the process selects from P its K nearest neighbors N(x, y) (Step 706). The process finds the minimum bounding box that encloses pixel (x, y) as well as N(x, y) (Step 708). The process sets the center of the local template as the center of the bounding box (Step 710). The process computes the area of the bounding box (Step 712) $A_N$(x, y). The process set the area of the local template as A(x, y)=max($A_N$(x, y),$A_{th}$) (Step 714). The process sets the ratio between height and width of the template r(x, y) according to Equation (3) (Step 716). The process determines the height and the width of the local template for pixel (x, y) (Step 718) and estimates the displacement of pixel (x, y) based on its local template (step 720).

Weighted Spatial Regularization

Local template matching provides a discrete displacement field without imposing any spatial coherence constraints. In order to obtain a spatially continuous deformation, the process applies the weighted regularization method, see an article by E. Suarez, C.-F. Westin, E. Rovaris, and J. Ruiz-Alzola in "Nonrigid registration using regularized matching weighted by local structures" published in *MICCAI*, pp. 581-589, 2002. In their approach, the regularization imposes spatial coherence taking into account the quality of matching according to an estimation of the local structure. Here, in accordance with the present invention, because the value of the maximum similarity measure is a good indication of the confidence level of the resulting displacement estimate, the certainty of the displacement estimation at each pixel is quantified by the product of the local maximum similarity measure $S^*(dx,dy,t_c)$ in the current frame and the gradient magnitude $|v(dx,dy,t_r)|_2$ in the reference frame, as:

$$C(dx,dy,t_c)=\max(|v(dx,dy,t_r)|_2 \cdot S^*(dx,dy,t_c), 0). \quad (4)$$

where $C(dx,dy, t_c)$ is the certainty map. Normalized convolution was used to achieve spatial regularization by incorporating the certainty measure as a weighting function in a least square fashion, see H. Knutsson and C.-F. Westin. Normalized and differential convolution: Methods for interpolation and filtering of incomplete and uncertain data. In *Proc. CVPR*, pp. 515-523, New York City, USA, 1993. Similar to H. Knutsson and C. F. Westin, the process adopts the zero-order approximation of the desired transformation function, and uses a 2-D Gaussian applicability function to enforce the basis elements.

Figure 8:
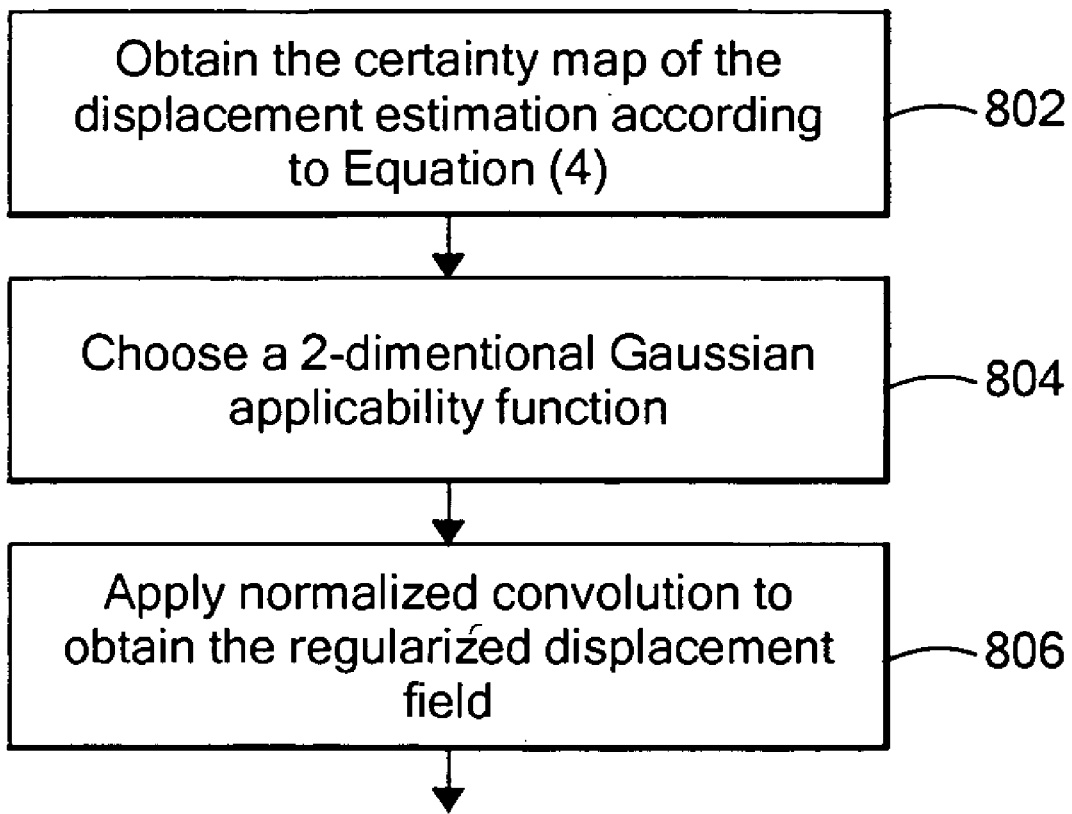
FIG. 8 is a flow diagram of a weighted registration process used in the registration process of FIG. 1 in accordance with the invention.

Referring now to FIG. 8, a flow diagram of the weighted registration process is shown. The process obtains the certainty map of the displacement estimation according to Equation (4) above (Step 802). A 2-dimensional Gaussian applicability function is selected. (Step 804). Normalized convolution is applied to obtain the regularized displacement field using the certainty map of the displacement estimation and the 2-dimensional Gaussian applicability function (Step 806).

Figure 4B:
Figure 4C:
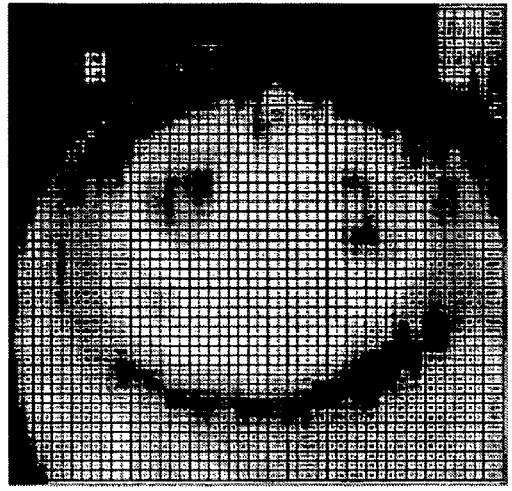
Figure 4D:
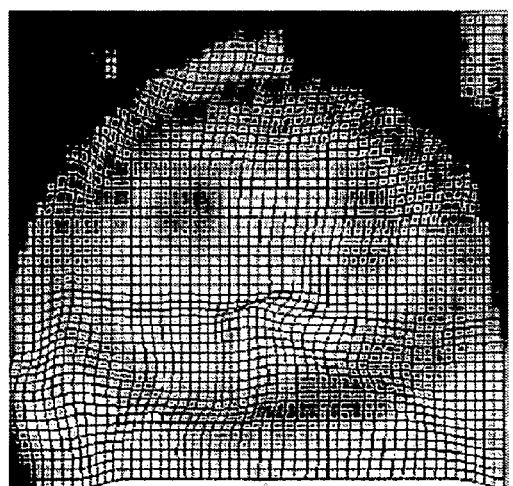

FIG. 4B shows the certainty map for the estimated displacements displayed in FIG. 4A. FIG. 4C shows the final deformation obtained using the certainty map shown in FIG. 4B and a 2-D Gaussian applicability function with σ=1.0. Compared to the deformation field of the reference frame shown in FIG. 4D, the deformation field of the current frame shown in FIG. 4C indeed captures the contraction and rotation of the left ventricle, and hence provides an accurate description of the local deformation.

Results

The process has been implemented in Matlab interfacing some external C libraries. Ten 10 cardiac MR perfusion data sets of real patients were tested. Each data set contains 3 slices. The slices are too far apart to support 3D registration so each slice is registered separately in 2D. The images were acquired on Siemens Sonata MR scanners following bolus injection of Gd-DTPA contrast agent. The dimension of the image is 256+192 pixels. The number of frames in each image sequence ranges from 50 to 60. The nonrigid registration for each slice was done within a minute on a Pentium 4 desktop computer.

For all the data sets in our study, large-scale translation can be identified reliably using the global template matching method described above. The experimental results for a representative data set to demonstrate the effectiveness of the nonrigid registration algorithm from two aspects: contour propagation and signal comparison are presented below:

Contour Propagation

Given the contour that delineates the boundary of the LV blood pool in the reference frame, one can propagate this contour to other frames according to the deformation field obtained using the method described in above, such as the one shown in FIG. 4C. Therefore, one way to evaluate the performance of the nonrigid registration algorithm is to verify whether the propagated contour delineates well the boundaries of the LV blood pool in other frames.

In our experiments, we obtain the contour by segmenting the LV blood pool in the reference frame. There are several segmentation methods that have been proposed for detecting the boundaries of the LV, see L. Spreeuwers and M. Breeuwer. Automatic detection of myocardial boundaries in MR cardio perfusion images. *MICCAI* 2001:1228-1231.

For simplicity, the image is assumed formed by two regions of approximately piecewise constant intensities of distinct values, and apply the level set method described by T. F. Chan and L. A. Vese in "Active contours without edges", *IEEE Trans. Image Processing*, 10(2):266-77, 2001.

Figure 5:
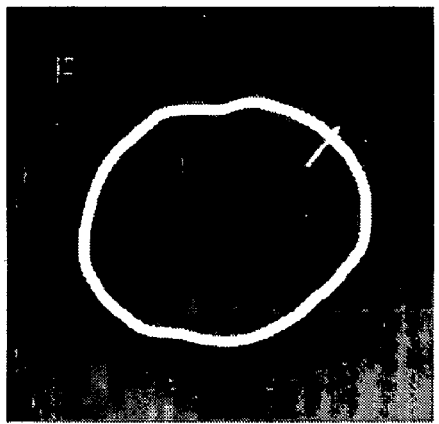
FIG. 5 shows contour propagation for three consecutive frames from a real patient cardiac MR perfusion scan processed in accordance with the invention, the top row shows the propagated contours before applying nonrigid registration, the bottom row shows the propagated contours after applying nonrigid registration, the bright arrows indicate where the contours differ the most.
Figure 5:
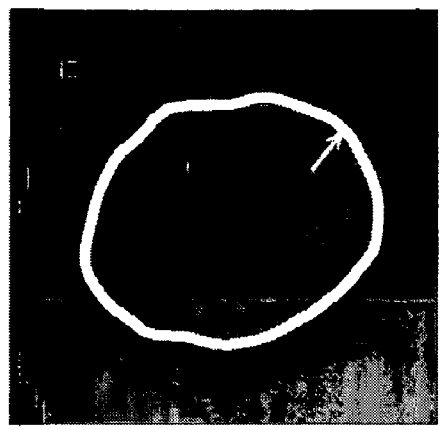
Figure 5:
Figure 5:
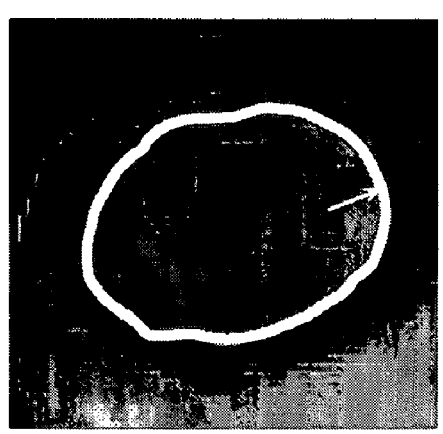
Figure 5:
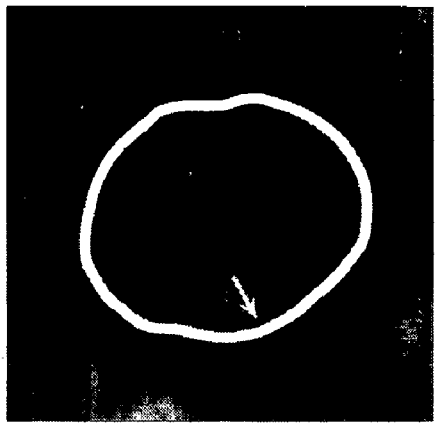
Figure 5:
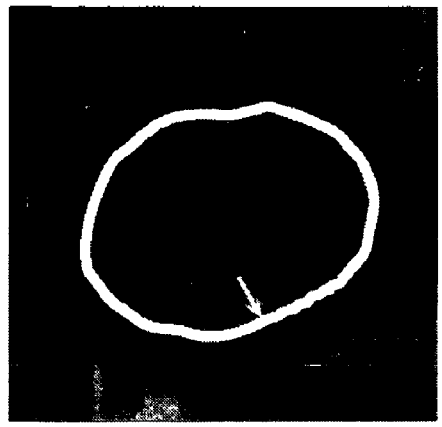

Our experimental results show that this method is able to identify the boundary of the blood pool with reasonable precision. FIG. 5 compares the propagated contours before and after applying nonrigid registration for 3 consecutive frames from a real cardiac MR perfusion scan. These frames are chosen because the LV in these images undergoes noticeable shape changes. In FIG. 5, the contours are overlaid on top of the roughly registered ROI. As shown, the contours in the top row of images, before nonrigid registration, do not lie exactly at the boundaries between the LV blood pool and the LV myocardium, especially at the regions that are indicated by the bright arrows. In contrast, the contours in the bottom row of images, after nonrigid registration, delineate well the boundaries between the LV blood pool and the LV myocardium. These results show that the proposed nonrigid registration algorithm improves the registration accuracy greatly when the shape of the left ventricle changes during perfusion.

For quantitative validation, we have manually drawn the contours that delineate the LV blood pool in each frame for one slice. The manually-drawn contour in the reference frame is propagated to other frames with global translation and local deformation, respectively. The maximum distance between two contours is used to measure how well the propagated contour matches the corresponding manually-drawn contour. With nonrigid registration, we observe an average decrease of 0.2 pixel in the maximum distance among all the frames. In particular, without nonrigid registration, the maximum distance between the propagated contour and the manually-drawn contour for the 3 frames shown in FIG. 5 are 2.0, 2.6, and 2.0 pixels, respectively, as compared to 1.5, 1.2, and 1.3 pixels when applying nonrigid registration. The consistent reduction in the maximum distance between the propagated contour and the manually-drawn contour verifies the effectiveness of the nonrigid registration algorithm.

Comparison of Intensity-Time Curves

In cardiac perfusion MRI, changes in pixel intensity corresponding to the same tissue across the image sequence are closely related to concentration of the contrast agent. As the concentration of the contrast agent changes smoothly during the perfusion process, the intensity-time curves should be temporally smooth at pixels that are located on the LV myocardium.

Figure 6B:
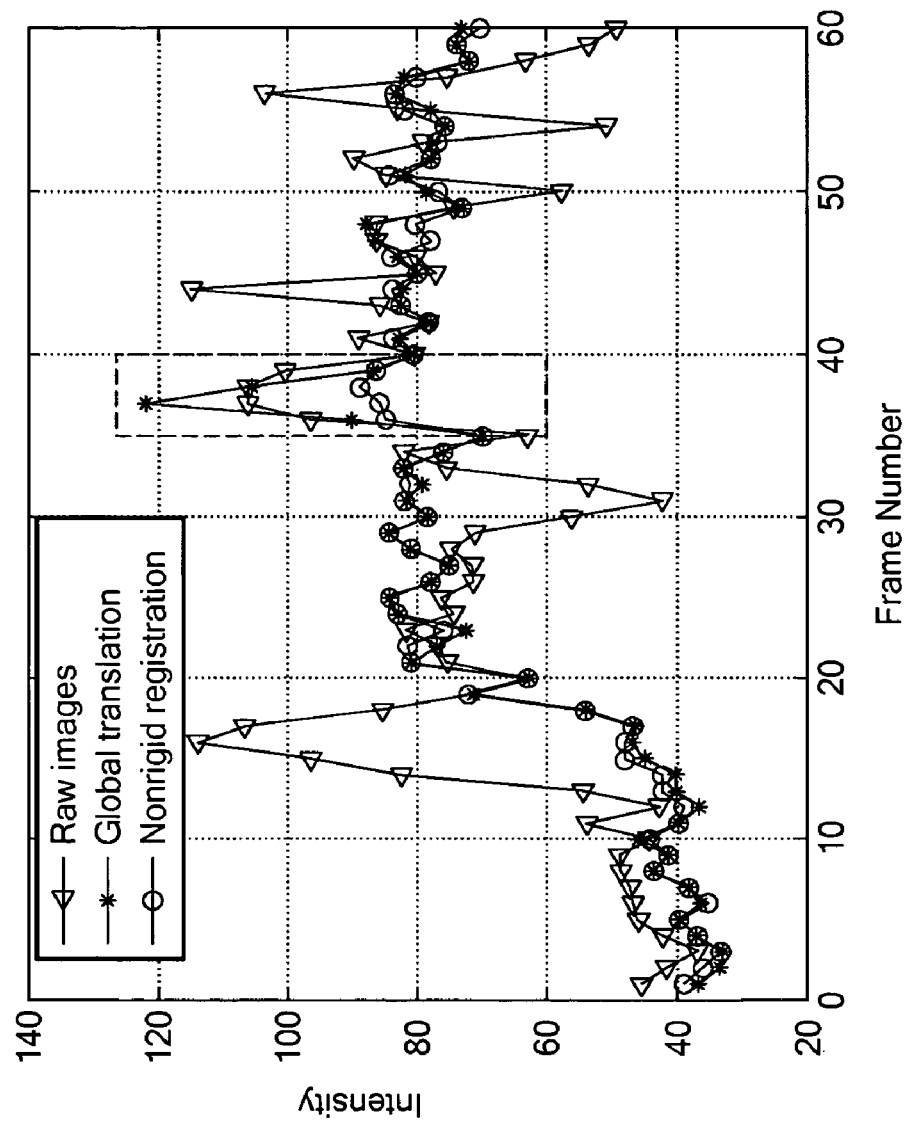
FIGS. 6A-6B show a comparison of intensity-time curves.
Figure 6A:
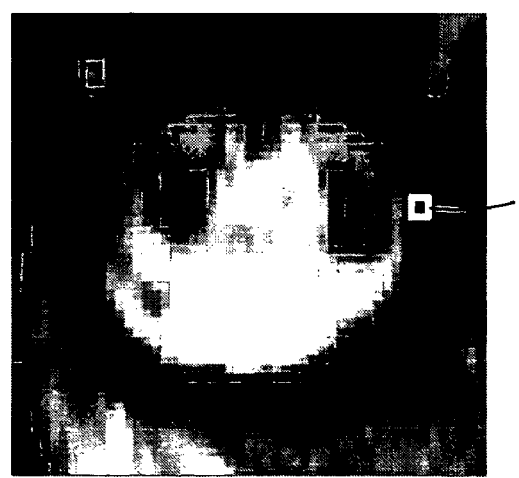
Figure 6C:
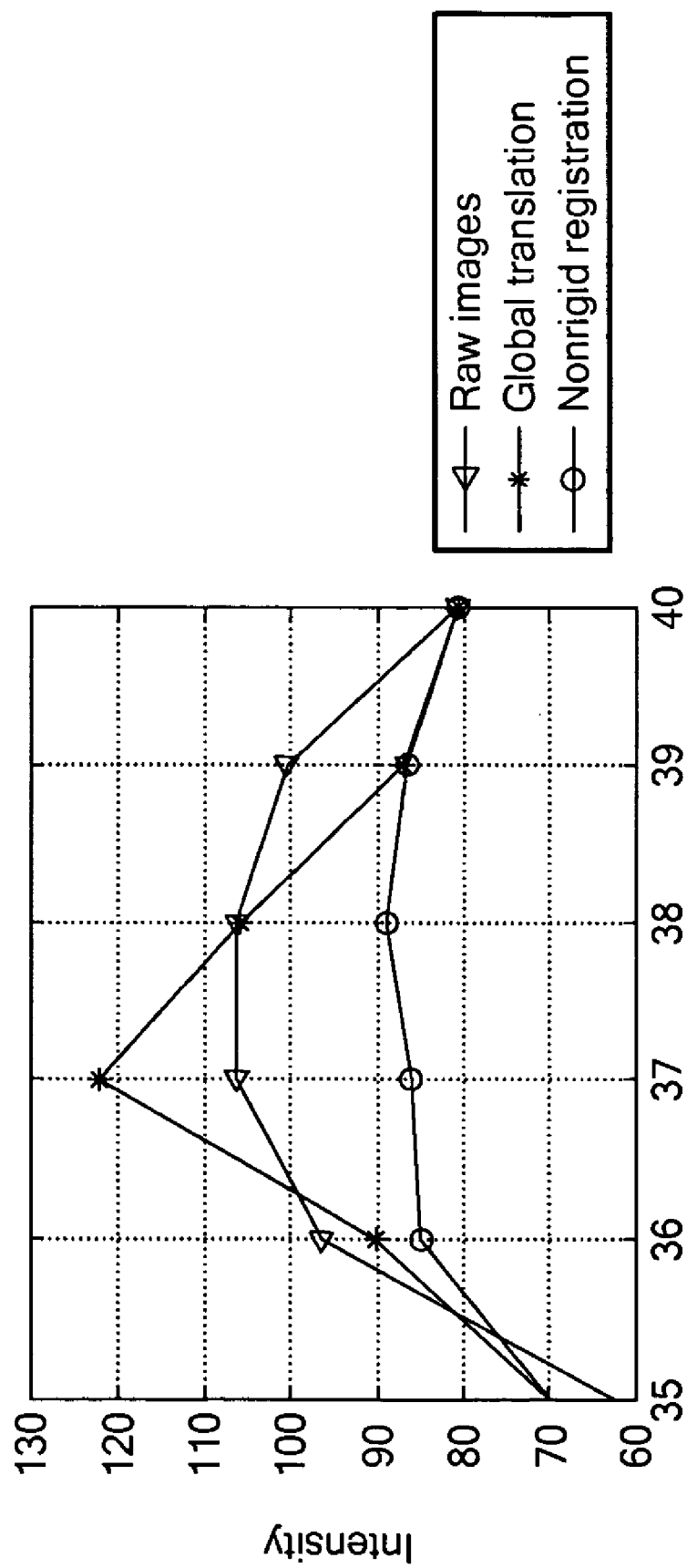

A 2×2 pixel window 12 is placed on the LV myocardium in the reference frame as shown in FIG. 6A. This window is chosen such that it is very close to the LV blood pool, but it is still inside the LV myocardium. Thus, the effects of the nonrigid registration can be reflected in the intensity-time curve. FIG. 6B plots the average intensity-time curves within the selected window, for the original/raw data set (triangle), after compensating for global translation (diamond), and after performing nonrigid registration (circle). For the original image sequence, the intensity-time curve exhibits very big oscillations at frames in which the global translation is large, e.g., frames 14-18 and frames 29-33. After compensating for the global translation, the intensity-time curve becomes temporally smoother without any dramatic oscillation except for frames 36-38. This is because global template matching is not capable of describing shape changes of the LV in these frames. However, after compensating for the local deformation by performing nonrigid registration, the intensity-time curve becomes smoother at frames when the LV undergoes noticeable local deformation. This is better seen in FIG. 6C, as shown by the enlarged view of the intensity-time curves for frames 35-40. Note that small local oscillations in the intensity-time curve are inevitable due to noises. These results strongly suggest that both global translation and local deformation are successfully compensated using the proposed nonrigid registration algorithm.

Thus, the process uses a nonrigid registration algorithm for dynamic cardiac MR perfusion images. The algorithm aims at correcting both global translation and local deformation of the LV. Large-scale translation is identified through global template matching using an edge-based similarity measure. The local deformation of the left ventricle is obtained through adaptive local template matching which adapts to the local edge distributions by varying the height and the width of the template as well as the location of the template followed by spatial regularization. By adaptively selecting the template for each pixel according to local gradient information, the algorithm tends to achieve the optimal trade-off between the localization accuracy and the reliability. By imposing spatial coherence on the discrete displacement fields, the algorithm produces continuous deformation fields that can describe any nonrigid motion of the LV. Our experimental results with real cardiac MR perfusion data sets have shown that the proposed nonrigid registration algorithm improves the registration accuracy and therefore leads to more accurate perfusion parameters, especially when the heart undergoes noticeable nonrigid local deformation.

A number of embodiments of the invention have been described. Nevertheless, it will be understood that various modifications may be made without departing from the spirit and scope of the invention. Accordingly, other embodiments are within the scope of the following claims.

What is claimed is:

1. A method for registering a sequence of images of an object, comprising:
using medical imaging equipment to perform the steps of:
identifying motion of the object using global template matching;
obtaining local deformation of the object comprising:
defining a threshold $G_{th}$ for a gradient map and an area of a threshold area, $A_{th}$ for a local template;
obtaining a set of pixels, P, whose gradient magnitudes are greater than $G_{th}$;
for each pixel p(x, y) within a region of interest, selecting from P its K nearest neighbors N(x, y);
finding the minimum bounding box that encloses pixel p(x, y) as well as N(x, y);
setting the center of the local template as the center of the bonding box;
computing the area of the bounding box $A_N(x, y)$;
setting the area of the local template as A(x, y)=max $(A_N(x, y), A_{th})$;
setting the ratio between height and width of a template;
determining the height and the width of the local template for pixel (x,y); and;
estimating displacement of pixel (x, y) based on its local template.

2. The process recited in claim 1 wherein:

$$r(x, y) = \frac{\sum_{(x,y) \in N(x,y)} M(x, y)|\sin(\theta(x, y,))|}{\sum_{(x,y) \in N(x,y)} M(x, y)|\cos(\theta(x, y,))|}$$

where: θ(x, y) and M(x, y) stand for respectively the orientation and the magnitude of the gradient.

3. The method recited in claim 2 including: applying weighted spatial regularization to the obtained local deformation.

4. The method recited in claim 3 the applying weighted spatial regularization to the obtained local deformation comprises:
obtaining a certainty map of the displacement estimation;
selecting a 2-dimensional Gaussian applicability function;
applying normalized convolution using the obtained certainty map and the Gaussian applicability function to obtain a regularized displacement field.

5. The method recited in claim 4 wherein the certainty map is $C(dx,dy,t_c)=\max(|v(dx,dy,t_r)|_2 \cdot S^*(dx,dy,t_c), 0)$
where $S^*(dx,dy,t_c)$ is the local maximum similarity measure in the current frame and $|v(dx,dy,t_r)|_2$ is the gradient magnitude in the reference frame.

6. A method for registering a sequence of images of an object, comprising:
using medical imaging equipment to perform the steps of:
identifying motion of the object using global template matching;

obtaining local deformation of the object comprising:
  estimating displacement of each pixel p(x, y) based on a local template having a variable size rectangular region centered at p(x,y) large enough to include a number of image gradient values above a predetermined threshold;
  wherein the rectangular regions has dimensions in accordance with the image gradients within the region.

7. The method recited in claim 6 wherein rectangular region has an area $A(x,y)$, and wherein the height and width of the rectangular region relative to a template $r(x,y)$ is such that the height is the square root of $(A(x,y)r(x,y))$ and the width is the square root of $(A(x,y)/r(x,y))$.

* * * * *